Sept. 23, 1969  S. M. CREIGHTON ET AL  3,468,943
CONTINUOUS NITRIC ACID OXIDATION OF COAL
Filed Aug. 16, 1966
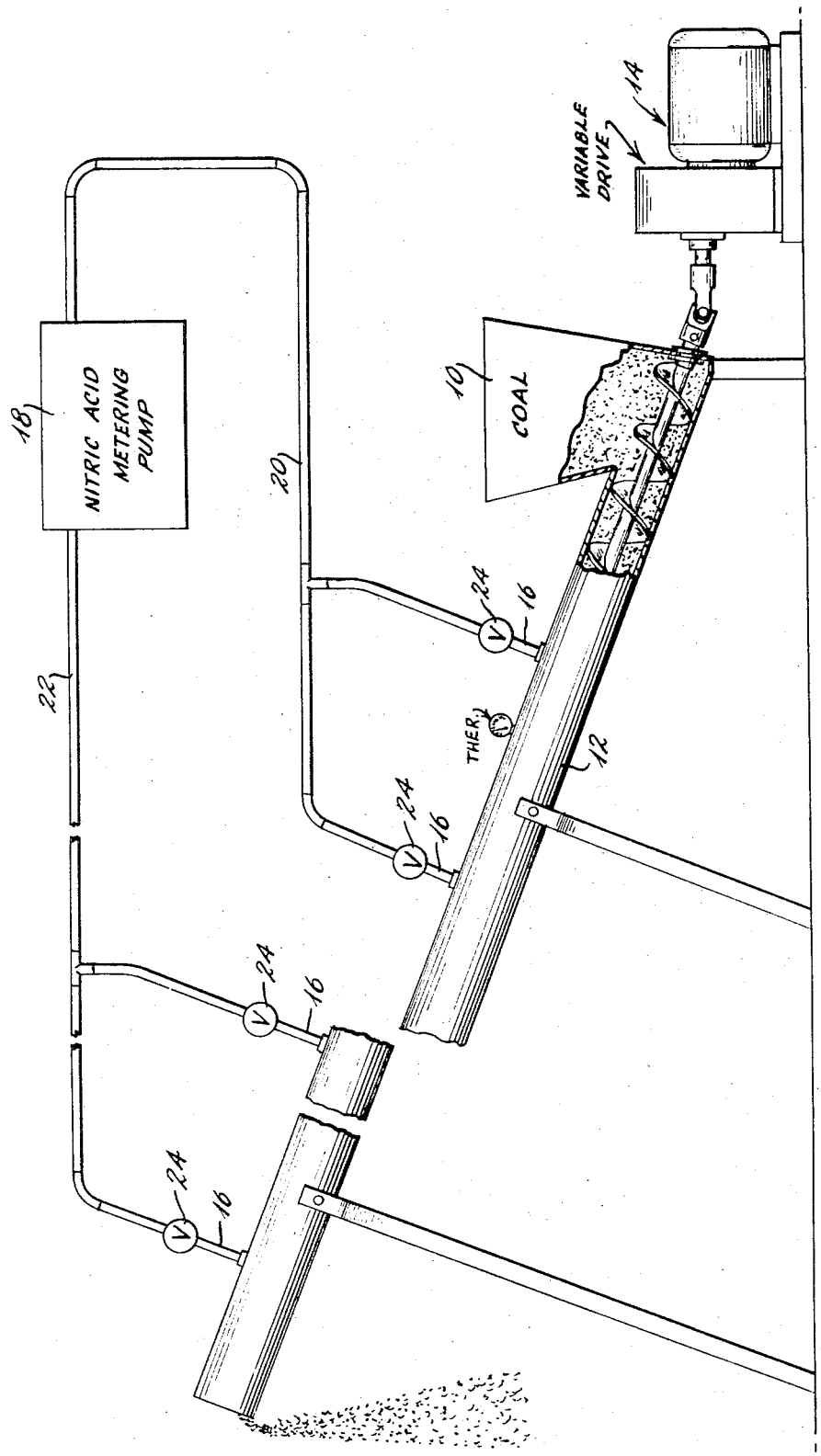

3,468,943
CONTINUOUS NITRIC ACID OXIDATION OF COAL
Stephen Mark Creighton and John Charles T. Wood, Edmonton, Alberta, Canada, assignors to Canadian Patents and Development Limited, Ottawa, Ontario, Canada, a company of Canada
Filed Aug. 16, 1966, Ser. No. 572,834
Int. Cl. C07c *63/02, 51/16*
U.S. Cl. 260—523                                5 Claims

ABSTRACT OF THE DISCLOSURE

A continuous process for oxidizing long rank coal to produce humic acids in which the coal is passed through a single or twin screw conveyor and concentrated nitric acid is fed along the length of the conveyor at spaced intervals so that the nitric acid added at any feed point is completely reacted before the coal arrives at the next nitric acid feed point.

---

The present invention relates to the preparation of humic acids by reaction of low rank coal with nitric acid.

Humic acids (generally recognized to be mixtures of organic acid bodies), are dark brown to black high molecular weight materials, alkali soluble or dispersable, acid insoluble. Humic acids are present in residues of plant origin notably peat and coal. They occur also in soils in widely varying amounts and are believed to have arisen there from the decay of plant materials. Considerable interest has been aroused in the possible use of humic acids as plant nutrients, for soil conditioners, tanning agent, additives for petroleum drilling muds, and in the formulation of plastics therewith. In particular, ammonium humate which may be formed by reacting ammonia or ammonium hydroxide with humic acids, has been suggested as nitrogenous fertilizer materials.

A recognized source of humic acids is coal, especially the low rank coals e.g., sub-bituminous coal, brown coal, lignites and the like, with their high combined hydrogen content. Indeed, the humic acid content of weathered coals, can be quite substantial. Unfortunately weathered low rang coals are not dependably available in the large quantities required for use as an industrial source of humic acid. In consequence various techniques including air oxidation and nitric acid oxidation, have been suggested to the art for converting low rank coals into humic acids.

The present invention is, particularly directed to an improved procedure for nitric acid oxidation of low rank coals.

Mixing coal with concentrated nitric acid occasions a violent exothermic reaction generating therefrom large amounts of steam and nitrogen oxides. The humic acid product of the reaction is like that present in weathered coals, i.e. a dark brown to black substance soluble or dispersible in aqueous alkali, substantially insoluble in an aqueous acidic media. However, it contains some combined nitrogen.

Mixing together large batches of coal and nitric acid in stoichiometric quantities as would be required for preparation of humic acids in commercial quantities is fraught with hazards. In order to obviate the difficulties, the prior art teaches controlling the reaction by employing dilute solutions of nitric acid, and by providing a reaction container equipped with agitation means and with heat exchange means to control reaction temperatures. Initially the reaction mixture is cooled to remove heat from the exothermic reaction; yet towards the end of the run the reaction mixture must be heated to complete the reaction. Then the reaction product must be dewatered and still additional heat is required to obtain a dry humic acid product. The aqueous portion of the reaction product contains unspent nitric acid and other oxygen-nitrogen acids, and along with the evolved oxides of nitrogen may be passed to a suitable nitric acid recovery system.

When a single reactor is used flow of acidic nitrogen-oxygen containing fluids to the recovery unit is intermittent, thus making the recovery of nitric acid inefficient and difficult. However, as suggested by British Patent 904,953, a more nearly continuous process for producing humic acids can be effected by employing a series of interconnecting batch reactors thereby delivering a more even flow of acidic nitrogen-oxygen fluids to the nitric acid recovery system. The coal is suspended in dilute acid (5% to 50% $HNO_3$ by weight), the mixture being passed serially through from 3–20 stirred reactors. The first few reactors are cooled to remove the exothermic reaction heat while the others are heated to promote the reaction and to control reaction temperatures to between 40–100° C. The humic acids reaction product still must be separated from the dilute spent nitric acid and dried.

Major shortcomings and disadvantages facing prior nitric acid oxidation procedure are:

(1) The exothermic heat of the reaction is not only wasted but has ot be removed thus adding to the economic burden of the process.

(2) The need to control reaction temperatures indicates usage of dilute nitric acid solutions (5 to 50% by weight) which necessitates large size reactor units.

(3) The evolved acidic nitrogen oxygen-containing gases are not utilized in the reaction but must be reprocessed to nitric acid in a secondary processing system.

(4) The humic acids produced must be recovered from an aqueous reaction mixture, freed from inorganic acids and dried, thus requiring additional equipment and labor.

The rationale of the present invention involves the reaction of low rank coal with nitric acid in a manner that enables use of concentrated nitric acid, use of nitric acid in nearly stoichiometric requirements for the reaction, and use of the exothermic heat of reaction to promote the reaction and to dry the humic acids product of the reaction. Desirably the process should not require complicated and cumbersome equipment, or even large amounts of equipment.

An object of the present invention is to provide a continuous process for oxidizing coal with concentrated nitric acid.

A further object of the invention is to provide a nitric acid coal oxidizing procedure which avoids the need to heat and cool the reaction mass.

Still another object of the invention is to provide a nitric acid coal oxidizing procedure which is not productive of an acidic aqueous co-product.

Yet a further object of the invention is to provide a nitric acid coal oxidizing procedure which directly results in a dry product.

Additional objects and advantages of the present invention will be apparent from the description thereof which follows.

Briefly stated the present process involves passing low rank coal through a mixing conveyor of extended length e.g. a single or twin screw conveyor, and at spaced apart intervals along the length of the mixing conveyor feeding in appropriate quantities of concentrated nitric acid. In theory and practice, the nitric acid added at any one location is thoroughly intermixed and completely reacted away before the coal arrives at the next nitric acid feed point. The coal heats up during the reaction only about enough to vaporize the water content of the nitric acid, the moisture content of the coal and also the $H_2O$ reaction product. The large mass of coal, relative to the nitric acid entering from any single feed point prevents overheating. Concurrent passage of the vapor products and coal the length of the mixing conveyor results in a high degree of nitric acid utilization and a high yield of humic acids.

A conveyor mixer is an advantageous reactor. Its capacity and throughput may be determined generally by the length and diameter then varied by adjusting the rate of rotation of the conveyor element. It is possible to provide for the addition of nitric acid of any desirable concentration by suitably choosing the location of nitric acid inlets, their number, and the rate of flow of nitric acid therethrough. In consequence, coal of varying degrees of reactivity can be reacted with nitric acid to any desired extent of reaction in the mixer conveyor. In addition, the oxygen-nitrogen containing acidic gaseous reaction products which pass concurrently with the coal emerge (along with the desired carbonaceous reaction products) from the conveyor mixer reactor in an essentially continuous fashion. The reaction mixture at this stage is hot (around 100° C.); consequently, its water content flashes off as steam leaving the desired carbonaceous reaction product in a free flowing state, dry in appearance and to the touch. The humic acids content of the carbonaceous reaction product may be converted directly to dry ammonium salts of humic acids by contacting them subsequently with anhydrous ammonia.

For further understanding of the present invention reference is now made to the attached drawing wherein is illustrated a preferred apparatus for effecting the above-described reactions. Coal is fed from a hopper 10 into a mixing conveyor 12, exemplarily a single or twin screw conveyor mixer of conventional construction, impelled by variable drive mechanism 14. Spaced apart at intervals along the length of conveyor mixer 12 are nitric acid inlet ports 16, four being shown by way of example. A nitric acid metering pump 18 forces nitric acid through line 20, 22 to acid inlet ports 16. For close control a valve 24 is provided adjacent each inlet port 16. For larger scale units each inlet port may be provided with its own metering pump. The variable drive 14 may be coordinated with metering pump 18 in order to relate the coal throughout and the quantity of nitric acid fed to inlet ports 16.

To assist in fuller comprehension of the invention the following examples of preferred practice thereunder are provided.

The reactor consisted of an auger seven feet in length, three inches in diameter, supported at an angle of 30° from the horizontal. The auger screw was operated at seven revolutions per minute, causing the coal to pass through this assembly at about three hundred grams per minute. The lowermost nitric acid inlet was located two feet above the coal inlet, three additional nitric acid inlets were placed at 1.5 foot intervals along the auger shell. Concentrated nitric acid (minimum 70% $HNO_3$ by weight) was introduced through each inlet at a rate of one milliliter per second.

After the auger was started up and some unreacted coal fore-run had passed out of the reactor, nitric acid addition was commenced. Shortly thereafter, the reactor and its contents heated up to operational temperatures due to the exothermic reaction that ensued, and hot reaction products consisting of the desired carbonaceous reaction product (humic acids) and a gaseous mixture of steam and oxides of nitrogen, began a continuous flow from the exit end of the auger. The desired carbonaceous product (humic acids) in a free flowing dry state, was collected.

Approximately one and seven tenths grams of coal were reacted for each milliliter of nitric acid used. The carbonaceous reaction product (humic acids) was 60 to 70% soluble in sodium hydroxide solution but was substantially insoluble in water.

Treatment of this carbonaceous reaction product with ammonia gas resulted in a product whose aqueous solubility could be adjusted, depending upon the amount of ammonia used, up to the 60 to 70% level that the humic acids product was soluble in a sodium hydroxide solution.

The following table shows the results of other runs in the same reactor when variations in overall throughput as well as in the ratio of nitric acid to coal were made.

TABLE I.—PRODUCTION OF HUMIC ACIDS FROM COAL

| Coal [1] particle size (B.S.S.) | Feed rate, g./min. | $HNO_3$ flow (l./hr.) (42° Be.) | Weight ratio $HNO_3$ sol'n. to coal | Humic acid content (percent) (dry, ash free) | Evolution of oxides of nitrogen |
|---|---|---|---|---|---|
| −50 | (Starting material) | | | 3.1 | |
| −20 to +50 | 300 | 14 | 1.1 | 43.0 | Extensive |
| −50 | 1,000 | 14 | 0.33 | 46.0 | Moderate. |
| −50 | 1,000 | 7 | 0.16 | 26.9 | Slight. |
| −50 [2] | 340 | 7.7 | 0.53 | 36.7 | Moderate. |

[1] Sub-bituminous coal of carbon content 68%.
[2] Air at 25 l./min. was introduced (with the nitric acid) through the second nitric acid inlet up from the hopper.

The foregoing description has been given in terms of low rank coal as the carbonaceous material reacted. The term low rank coal is intended to include such materials known as sub-bituminous coal, lignite and peat. Alternatively when a high nitrogen fertilizer is desired, the low rank coal may first be oxidized by air and ammonia, as is disclosed for example in Indian Patents 53,347, 43,527, and 62,337 and the copending Wood and Yaremko application.

When the conveyor reactor is operated under conditions which cause large quantities of oxides of nitrogen to be emitted from the discharge end these oxides may be passed into the coal feed hopper or into the lower most level of the reactor, where they will react with the coal feed before it enters the main reaction zone of the conveyor reactor. Preheating of the coal in the feed bin would make the reaction of recycled oxides of nitrogen easier and more complete. Heated coal feed would also react more rapidly in the main reaction zone and therefore increase the capacity of a given size conveyor reactor.

Introduction of air, oxygen, ozone, or mixtures of these gases might also improve the efficiency of the pre-oxidation step or that of the main reaction. Still further changes and modifications will readily occur to the skilled in the art and such variations are intended to fall within the scope of the hereto appended claims.

What is claimed is:

1. A continuous process for converting carbonaceous materials to humic acids which comprises passing a feed stream of finely divided carbonaceous material through a linearly extended path of travel and effecting substantial intermixing during passage therethrough, adding a stream of nitric acid at each of a plurality of spaced apart locations on the path of travel, the nitric acid added at each location being essentially interreacted with the carbonaceous material prior to arrival of the carbonaceous material at the next nitric acid feed location, the humic acid reaction product emerging from the path of travel in an essentially dry state.

2. The process of claim 1 wherein the path of travel is enclosed and the carbonaceous particles pass concurrently with gaseous and vapor reaction products, separating only at the terminus of the path of travel.

3. The process of claim 1 wherein concentrated nitric acid in essentially stoichiometric quantities for the reaction is employed.

4. The process of claim 1 wherein the carbonaceous material is low rank coal.

5. The process of claim 1 wherein the carbonaceous material is the nitrogen enriched coal resulting from air-ammonia oxidation of low rank coal.

References Cited

FOREIGN PATENTS 677,145   12/1963   Canada.

LORRAINE A. WEINBERGER, Primary Examiner

J. NIELSEN, Assistant Examiner

U.S. Cl. X.R.

260—515